United States Patent
Arashi et al.

(10) Patent No.: US 9,464,005 B2
(45) Date of Patent: Oct. 11, 2016

(54) DIELECTRIC CERAMIC COMPOSITION COMPRISING $Bi_2O_3$, ZNO, $NB_2O_5$ AND $V_2O_5$, DIELECTRIC CERAMIC, ELECTRONIC DEVICE, AND COMMUNICATION DEVICE

(71) Applicant: TDK CORPORATION, Tokyo (JP)

(72) Inventors: Tomohiro Arashi, Tokyo (JP); Osamu Taguchi, Tokyo (JP); Tomoaki Kawata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 21 days.

(21) Appl. No.: 14/242,015

(22) Filed: Apr. 1, 2014

(65) Prior Publication Data
US 2014/0302320 A1    Oct. 9, 2014

(30) Foreign Application Priority Data

Apr. 4, 2013    (JP) ................. 2013-078935

(51) Int. Cl.
*C04B 35/453*    (2006.01)
*C04B 35/495*    (2006.01)
*H01G 4/12*    (2006.01)

(52) U.S. Cl.
CPC ......... C04B 35/495 (2013.01); C04B 35/453 (2013.01); H01G 4/1209 (2013.01); *C04B 2235/3239* (2013.01); *C04B 2235/3251* (2013.01); *C04B 2235/3284* (2013.01); *C04B 2235/3298* (2013.01); *C04B 2235/5445* (2013.01); *C04B 2235/785* (2013.01); *C04B 2235/96* (2013.01); *Y10T 428/2982* (2015.01)

(58) Field of Classification Search
CPC ........................ C04B 35/453; C04B 35/495
USPC ....................... 501/134, 139, 152
See application file for complete search history.

(56) References Cited

U.S. PATENT DOCUMENTS

| | | | |
|---|---|---|---|
| 6,950,584 B1 * | 9/2005 | Suzuki | 385/122 |
| 7,816,293 B2 | 10/2010 | Dudesek et al. | |
| 2012/0213952 A1 * | 8/2012 | Dennis | 428/34 |
| 2012/0213954 A1 * | 8/2012 | Dennis | 428/34 |

FOREIGN PATENT DOCUMENTS

| | | |
|---|---|---|
| JP | 2009537444 A | 10/2009 |
| JP | B2-4494881 | 6/2010 |

OTHER PUBLICATIONS

Wang et al., "Improvements of Sintering and Dielectric Properties on Bi2O3—ZnO—Nb2O5 Pyrochlore Ceramics by V2O5 Substitution," Ceramics International, 2004, vol. 30, No. 7, pp. 1225-1229.

* cited by examiner

*Primary Examiner* — Holly Le
(74) *Attorney, Agent, or Firm* — Oliff PLC

(57) ABSTRACT

A dielectric ceramic composition is represented by a general formula "$xBi_2O_3 \cdot yZnO \cdot (z-a)Nb_2O_5 \cdot aV_2O_5$". The variables, "x", "y", "z" and "a" in the general formula respectively satisfy the following conditions: $2.90 \leq x \leq 3.10$, $1.90 \leq y \leq 2.10$, $1.90 \leq z \leq 2.10$, and $0.0005 \leq a \leq 0.020$.

14 Claims, No Drawings

DIELECTRIC CERAMIC COMPOSITION COMPRISING $Bi_2O_3$, ZNO, $NB_2O_5$ AND $V_2O_5$, DIELECTRIC CERAMIC, ELECTRONIC DEVICE, AND COMMUNICATION DEVICE

BACKGROUND OF THE INVENTION

1. Field of the Invention

The present invention relates to a dielectric ceramic composition capable of low-temperature firing, a dielectric ceramic comprised of the composition, an electronic device and a communication device including the ceramic.

2. Description of the Related Art

Recently, as electronic devices employed in a communication device such as a mobile phone are miniaturized with high performance at a high frequency range, demands for devices capable of exhibiting a high frequency property abruptly increase.

Particularly, for a mobile communication device such as a mobile phone which is in high demand, high frequency band called quasi-microwave ranging from several hundred MHz to several GHz is used. In line with that, for electronic devices such as capacitors, filters, resonators, and circuit boards employed in the mobile communication devices, properties applicable to the high frequency band are required.

As materials having a high dielectric constant in the microwave range, Bi—Zn—Nb based oxide is known.

Patent Document 1 discloses Bi—Zn—Nb based dielectrics exhibiting excellent dielectric properties (high relative dielectric constant ($\in r$) and high Qf value). However, in Patent Document 1, the firing temperature still exceeds 900° C. and further reduction of the temperature is required for the purpose of electronic devices that Ag is used as an internal conductor. Further, for the Bi—Zn—Nb based dielectrics, it is known that bending strength is generally low.

In view of the above, in order for further improving performance of the Bi—Zn—Nb based dielectrics, it is required to increase the bending strength while maintaining excellent dielectric properties.

Patent Document 1: Japanese Patent No. 4494881

SUMMARY OF THE INVENTION

It is therefore an object of the present invention to provide a dielectric ceramic composition capable of low-temperature firing below 900° C. and exhibiting excellent dielectric properties (high relative dielectric constant ($\in r$) and high Qf value) and also high bending strength, a dielectric ceramic comprised of the composition, and an electronic device and a communication device including the ceramic.

In order to achieve the object of the present invention, there is provided a dielectric ceramic composition represented by a general formula:

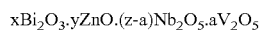

wherein,
"x", "y", "z" and "a" in the general formula respectively satisfies the followings conditions;
$2.90 \leq x \leq 3.10$
$1.90 \leq y \leq 2.10$
$1.90 \leq z \leq 2.10$, and
$0.0005 \leq a \leq 0.020$.

For the dielectric ceramic composition represented by the general formula "$xBi_2O_3 \cdot yZnO \cdot (z-a)Nb_2O_5 \cdot aV_2O_5$," by determining the values of "x", "y", "z" and "a" in the above range, it enables to obtain excellent dielectric properties (high relative dielectric constant (for example, $\in r \geq 75$) and high Qf value (for example, $Q \cdot f \geq 3000GHz$)) and also perform a low-temperature firing below 900° C. With this, it enables to improve the bending strength (for example, the bending strength exceeds 250MPa).

For the dielectric ceramic composition, a median particle size (D50) is preferably 0.4 to 0.8 μm.

Further, a dielectric ceramic according to the present invention is comprised of the dielectric ceramic composition.

For the dielectric ceramic, the average grain size "d" after firing is preferably 0.5 to 1.0 μm.

Further, an electronic device according to the present invention includes the dielectric ceramic.

Further, a communication device according to the present invention includes the electronic device.

Further, in the specification, the dielectric ceramic composition is a source material composition of the dielectric ceramic and can be obtained by calcining compounds of source materials which are prepared so as to achieve the above composition and then pulverizing thereof. Further, the dielectric ceramic is a sintered body which can be obtained by forming the dielectric ceramic composition and then heat-treating thereof.

Further, sintering denotes a phenomenon that the dielectric ceramic composition is sintered to produce a dense body called a sintered compact, by performing the heat-treatment on the dielectric ceramic composition. Generally, compared with the dielectric ceramic composition before the heat-treatment, for the sintered compact after the heat-treatment, the density and the mechanical strength tends to increase.

Further, the sintering temperature denotes a temperature when the dielectric ceramic composition is sintered.

Furthermore, firing denotes a heat-treatment for the purpose of sintering, and the sintering temperature denotes an atmosphere temperature that the dielectric ceramic composition is exposed when the heat-treatment is performed.

DESCRIPTION OF THE PREFERRED EMBODIMENTS

The followings are the detailed explanations regarding the manner of implementation of the present invention (hereinafter referred to as "embodiments"). The following embodiments are exemplified in order to explain the present invention, and the present invention is not limited to the embodiments described below. The present invention is appropriately capable of modifications without departing from the scope of the invention.

The dielectric ceramic composition of the present invention contains a dielectric ceramic composition represented by a general formula "$xBi_2O_3 \cdot yZnO \cdot (z-a)Nb_2O_5 \cdot aV_2O_5$" as a main component. In this case, the amount of oxides (O) may slightly deviate from the stoichiometric composition represented by the above formula.

In the above formula, "x" is $2.90 \leq x \leq 3.10$, and preferably $2.95 \leq x \leq 3.05$. "x" represents a component ratio of $Bi_2O_3$. Further, by determining "x" in the above range, it enables to achieve the dielectric ceramic composition exhibiting excellent dielectric properties.

In the above formula, "y" is $1.90 \leq y \leq 2.10$ and preferably $1.95 \leq y \leq 2.05$. "y" represents a component ratio of ZnO. Further, by determining "y" in the above range, it enables to achieve the dielectric ceramic composition exhibiting excellent dielectric properties.

In the above formula, "z" is 1.90≤z≤2.10, and preferably 1.95≤z≤2.05. "z" represents the sum of component ratio of $Nb_2O_5$ and $V_2O_5$. Further, by determining "z" in the above range, it enables to achieve the dielectric ceramic composition exhibiting excellent dielectric properties.

In the above formula, "a" is 0.0005≤a≤0.020, and preferably 0.001≤a≤0.003. "a" represents the amount of substitution of $V_2O_5$ which substitutes for a part of component ratio of $Nb_2O_5$ when the dielectric ceramic composition is represented by a general formula "$xBi_2O_3 \cdot yZnO \cdot (z-a)Nb_2O_5 \cdot aV_2O_5$." By determining "a" as 0.0005 or more, it enables to fire below 900° C. Further, it enables to obtain a dense sintered compact having the average grain size of 1.0 μm or less and particularly enables to improve the bending strength. Further, by determining "a" as 0.020 or less, high bending strength can be achieved while maintaining excellent dielectric properties.

The average grain size of the dielectric ceramic is preferably 1.0 μm or less, and more preferably 0.7 μm or less. Although the lower limit of the average grain size is not particularly limited, it is usually approximately 0.5 μm. When the average grain size of the dielectric ceramic is too large, the bending strength tends to decrease.

The average grain size of the dielectric ceramic can be evaluated by observing the dielectric ceramic with SEM, measuring the grain size of the predetermined number of dielectric grains, and then calculating based on the obtained measurement results. Further, the grain size of each dielectric grain can be evaluated, for example, by a coding method in which each grain is hypothesized as a ball. Further, when calculating the average grain size, the number of particles for measuring the grain size is determined as generally 100 or more.

Production Method of the Dielectric Ceramic

Next, the followings are the explanations of an example regarding a production method of dielectric ceramic of the present embodiment.

As source materials of main component of the dielectric ceramic composition of the present invention, Bi oxide, Zn oxide, Nb oxide, V oxide, a mixture and a composite oxide thereof can be used. Further, various compounds, for example, appropriately selected from carbonate, oxalate, nitrate, hydroxide, organometallic compound and mixed, which serves as the above-mentioned oxide and composite oxide by firing, may be used.

In the present embodiment, each source material of main component is weighed so as to achieve the predetermined composition ratio and then mixed. As a mixing method, although it is not particularly limited, for example, a dry-mixing may be performed on source powder in a powder state, or a wet-mixing may be performed with a ball mill by adding water, organic solvent, dispersant and the like to source powder. For the mixing time, it may be 4 to 24 hours, for example.

Next, calcining is performed on the mixture. With this calcining, crystal composed of $Bi_2O_3$—ZnO—$Nb_2O_5$—$V_2O_5$ is produced. For the calcining, the holding temperature is preferably 700 to 900° C., and the holding time of the temperature is preferably 1 to 15 hours. This calcining may be performed in the air. Or, it may be performed in the atmosphere where oxygen partial pressure is higher than the air or in the pure oxygen atmosphere.

Next, the powder obtained by calcination is pulverized to prepare powders before firing. For a pulverizing method, although it is not particularly limited, for example, a wet-milling can be performed with a ball mill by adding water, organic solvent, dispersant and the like to powders obtained by calcination. For the pulverizing time, it may be 4 to 24 hours, for example.

For the particle size of powders before firing, although it is not particularly limited, a median particle size (D50) is preferably 0.4 to 0.8 μm. By determining the particle size of powders before firing in the above range, the average grain size of the dielectric ceramic after sintering can be 0.5 to 1.0 μm.

Further, after blending organic binders such as acrylic binder, ethyl cellulose binder, nylon binder and the like with the obtained powders before firing, molding is performed in a desired shape and then the molded material thereby obtained is fired for sintering. For the molding method, it may apply a wet-molding such as a sheet method and a printing method, or it may apply a dry-molding such as a press-molding. The molding method can be appropriately selected according the desired shape. Further, firing is preferably performed, for example, under oxygen atmosphere similar to the air, and it is necessary that the firing temperature is below the melting point of conductor such as Ag used as an internal electrode or alloys containing Ag as a main component. Specifically, the firing temperature is preferably below 900° C., and more preferably 840 to 880° C.

For the holding time at the firing temperature, it is specifically 0.1 to 5 hours.

As above, the embodiments of the present invention are explained. However, the present invention is not limited to the above-mentioned embodiments and capable of various modifications without departing from the scope of the invention.

For example, for the dielectric ceramic composition according to the above-mentioned embodiments, several ppm to several hundred ppm of oxides of inevitable impurity elements in a source material may be included, other than the above-mentioned components.

The purpose of the dielectric ceramic according to the present invention is not particularly limited. However, for example, it can be preferably used as a dielectric layer of various electronic devices such as capacitors, filters, resonators, and circuit boards.

Further, electronic devices including the dielectric ceramic according to the present invention can be preferably used in a mobile communication device such as a mobile phone and also in various communication devices such as PC and the like.

The followings are the detailed explanation of the present invention based on examples. However, the present invention is not limited to these examples.

EXAMPLE 1

First, $Bi_2O_3$, ZnO, $Nb_2O_5$ and $V_2O_5$ were prepared as source powders. These source materials were weighed so that the composition ratio after firing became as follows; "x" represents 3.00, "y" and "z" represent 2.00, and "a" respectively represents values as indicated in Table 1 in the general formula "$xBi_2O_3 \cdot yZnO \cdot (z-a)Nb_2O_5 \cdot aV_2O_5$" and deionized water was added to perform a wet-mixing with a ball mill for 16 hours and then dried.

Powders after drying was calcined at a holding temperature of 800° C. with a holding time of 5 hours in the air atmosphere.

After adding deionized water to calcined powders and then performing a wet-milling with a ball mill until a median particle size (D50) becomes 0.6 μm, the mixture thereby obtained was dried to produce a dielectric ceramic composition.

Next, polyvinyl alcohol (PVA) aqueous solution was added to this dielectric ceramic composition as an organic binder and then granulated. After that, a press-molding was performed to obtain a columnar compact having a diameter of 12.0 mm and a thickness of 6.0 mm.

The obtained compact was fired under the following condition to obtain a sintered compact (samples 1 to 12). For the firing condition, it was determined that the holding temperature was 840 to 930° C. as indicated in Table 1 and the holding time was one hour, and the atmosphere was in the air atmosphere.

Further, it was confirmed by a glass bead method using an X-ray fluorescence analyzer that the composition of the obtained sintered compact corresponded to the composition indicated in Table 1.

(Evaluation)

Relative Dielectric Constant ∈r

The sintered compact was processed into a columnar shape having a diameter of 10.0 mm and a height of 5.0 mm and measured in accordance with the Japanese Industrial Standards "Testing method for dielectric properties of fine ceramics at microwave frequency" (JIS R 1627, Year of 1996). The result is shown in Table 1. For the evaluation criteria, 75 or more was considered preferable.

Qf Value

Under the same condition as the measurement condition of the relative dielectric constant, Q value was calculated and then multiply it by resonance frequency fr to evaluate Qf value. For the Qf value, the higher value is preferable. For the evaluation criteria, 3000 GHz or more was considered preferable. The result is shown in Table 1.

Bending Strength σ

Bending strength σ (unit: MPa) was calculated by a three-point bending test in accordance with the Japanese Industrial Standards "Testing method for bending strength of fine ceramics at room temperature" (KS R 1601, Year of 2008). The result is shown in Table 1. For the evaluation criteria, ten test pieces were formed for each sample, and it was considered preferable that the average value was 250 MPa or more.

Average Grain Size "d"

For measuring the average grain size of the dielectric ceramic, first, the obtained sintered compact was polished. Then, a chemical etching or a thermal etching was performed on the polished surface and thereafter observation was performed by a scanning electron microscope (SEM) to calculate the average grain size by a coding method in which the shape of the dielectric particle is hypothesized as a ball. The result is shown in Table 1. For the evaluation criteria, 1.0 μm or less was considered preferable.

TABLE 1

| Sample No. | Amount of Substitution "a" | D50 (μm) | Firing Temperature (° C.) | Dielectric Property ∈r | Qf (GHz) | Transverse Strength σ (MPa) | Average Crystal Particle Size "d" (μm) |
|---|---|---|---|---|---|---|---|
| 1 | 0.0000 | 0.6 | 930 | 77.1 | 3780 | 190 | 1.4 |
| 2 | 0.0005 | 0.6 | 900 | 77.8 | 3940 | 250 | 1.0 |
| 3 | 0.0010 | 0.6 | 880 | 77.9 | 3990 | 260 | 0.9 |
| 4 | 0.0015 | 0.6 | 860 | 78.0 | 4030 | 270 | 0.8 |
| 5 | 0.0020 | 0.6 | 850 | 78.1 | 4050 | 280 | 0.7 |
| 6 | 0.0025 | 0.6 | 840 | 78.1 | 4060 | 280 | 0.7 |
| 7 | 0.0030 | 0.6 | 840 | 78.1 | 4000 | 270 | 0.7 |
| 8 | 0.0050 | 0.6 | 840 | 78.1 | 3860 | 270 | 0.7 |
| 9 | 0.0100 | 0.6 | 840 | 78.0 | 3560 | 270 | 0.7 |
| 10 | 0.0150 | 0.6 | 840 | 77.9 | 3280 | 270 | 0.7 |
| 11 | 0.0200 | 0.6 | 840 | 77.8 | 3030 | 270 | 0.8 |
| 12 | 0.0300 | 0.6 | 840 | 77.6 | 2420 | 260 | 0.9 |
|  |  |  |  |  | ≥3000 | ≥250 | 0.5-1.0 |

As shown in Table 1, in the composition of the dielectric ceramic composition represented by the general formula "$xBi_2O_3 \cdot yZnO \cdot (z-a)Nb_2O_5$" when the values of "x", "y", "z" and "a" were within the range of the present invention, it was confirmed that both dielectric properties (relative dielectric constant and Qf value) and bending strength exhibit favorable results (samples 2 to 11).

With respect to this, as shown in Table 1, in the composition of the dielectric ceramic composition represented by the general formula "$xBi_2O_3 \cdot yZnO \cdot (z-a)Nb_2O_5 \cdot aV_2O_5$" when "a" was less than 0.0005, it was confirmed that the bending strength was particularly low and the average grain size exceeded 1.0μm (sample 1).

Further, as indicated in Table 1, in the composition of the dielectric ceramic composition represented by the general formula "$xBi_2O_3 \cdot yZnO \cdot (z-a)Nb_2O_5 \cdot aV_2O_5$," when "a" exceeded 0.0200, it was confirmed that Qf value particularly tended to decrease (sample 12).

EXAMPLE 2

Except that a median particle size (D50) of the dielectric ceramic composition was changed as indicated in Table 2, a sintered compact was produced (samples 13 and 14) in the same way with Example 1 and the bending strength and the average grain size were evaluated in the same way with Example 1. The result is shown in Table 2.

TABLE 2

| Sample No. | Amount of Substitution "a" | D50 (μm) | Firing Temeprature (° C.) | Transverse Strength σ (MPa) | Average Crystal Particle Size "d" (μm) |
|---|---|---|---|---|---|
| 13 | 0.0025 | 0.4 | 840 | 270 | 0.5 |
| 6 | 0.0025 | 0.6 | 840 | 280 | 0.7 |
| 14 | 0.0025 | 0.8 | 840 | 260 | 0.9 |

As shown in Table 2, by adjusting the median particle size (D50) of the dielectric ceramic composition, it was confirmed that the bending strength and the average grain size could be adjusted in a preferable range (samples 13 and 14).

For the dielectric ceramic composition according to the present invention, it is capable of firing on or below 900° C., simultaneously firing with Ag, and obtaining excellent dielectric properties of ∈r≥75 and Qf≥3000 GHz, and further capable of obtaining a dielectric ceramic which can be used as electronic devices by having bending strength of over 250 MPa.

The invention claimed is:

1. A dielectric ceramic composition represented by a general formula:

$$xBi_2O_3 \cdot yZnO \cdot (z-a)Nb_2O_5 \cdot aV_2O_5,$$

wherein:
"x", "y", "z" and "a" in the general formula respectively satisfies the following conditions;
$2.90 \leq x \leq 3.10$
$1.90 \leq y \leq 2.10$
$1.90 \leq z \leq 2.10$, and
$0.0005 \leq a \leq 0.020$.

2. The dielectric ceramic composition as set forth in claim 1, wherein the composition is in the form of a powder having a median particle size (D50) of 0.4 to 0.8 μm.

3. A dielectric ceramic formed by firing the dielectric ceramic composition as set forth in claim 2.

4. The dielectric ceramic as set forth in claim 3, wherein an average grain size "d" of the dielectric ceramic is 0.5 to 1.0 μm.

5. An electronic device, including the dielectric ceramic as set forth in claim 4.

6. A communication device, including the electronic device as set forth in claim 5.

7. An electronic device, including the dielectric ceramic as set forth in claim 3.

8. A communication device, including the electronic device as set forth in claim 7.

9. A dielectric ceramic formed by firing the dielectric ceramic composition as set forth in claim 1.

10. The dielectric ceramic as set forth in claim 9, wherein an average grain size "d" of the dielectric ceramic is 0.5 to 1.0 μm.

11. An electronic device, including the dielectric ceramic as set forth in claim 10.

12. A communication device, including the electronic device as set forth in claim 11.

13. An electronic device, including the dielectric ceramic as set forth in claim 9.

14. A communication device, including the electronic device as set forth in claim 13.

* * * * *